(12) United States Patent
Xu et al.

(10) Patent No.: US 9,196,081 B2
(45) Date of Patent: Nov. 24, 2015

(54) TECHNIQUES FOR ENHANCING MULTIPLE VIEW PERFORMANCE IN A THREE DIMENSIONAL PIPELINE

(75) Inventors: Xianchao Xu, Beijing (CN); Lili Gong, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 154 days.

(21) Appl. No.: 13/997,214

(22) PCT Filed: Dec. 15, 2011

(86) PCT No.: PCT/US2011/065232
§ 371 (c)(1),
(2), (4) Date: Jun. 22, 2013

(87) PCT Pub. No.: WO2013/089751
PCT Pub. Date: Jun. 20, 2013

(65) Prior Publication Data
US 2013/0278599 A1    Oct. 24, 2013

(51) Int. Cl.
G06T 1/20 (2006.01)
G06T 15/08 (2011.01)
G06T 15/00 (2011.01)
G06T 15/20 (2011.01)

(52) U.S. Cl.
CPC ............... *G06T 15/08* (2013.01); *G06T 15/005* (2013.01); *G06T 15/20* (2013.01)

(58) Field of Classification Search
CPC ................................ G06T 1/20; G06T 15/005
See application file for complete search history.

(56) References Cited

U.S. PATENT DOCUMENTS

| | | | |
|---|---|---|---|
| 4,945,500 A * | 7/1990 | Deering | 345/422 |
| 5,898,437 A | 4/1999 | Deolaliker | |
| 6,421,051 B1 | 7/2002 | Kato | |
| 7,928,989 B1 * | 4/2011 | Brown et al. | 345/543 |
| 2001/0019333 A1 | 9/2001 | Sasaki | |
| 2002/0158865 A1 * | 10/2002 | Dye et al. | 345/419 |
| 2003/0184555 A1 * | 10/2003 | Fraser | 345/582 |

OTHER PUBLICATIONS

International Search Report and Written Opinion mailed Jun. 21, 2012 for corresponding PCT/US2011/065232 filed Dec. 15, 2011 (nine (9) pages).

* cited by examiner

*Primary Examiner* — Stephen R Koziol
*Assistant Examiner* — Robert Craddock
(74) *Attorney, Agent, or Firm* — Kacvinsky Daisak Bluni PLLC (57) ABSTRACT

Techniques may be directed to enhancing multiple view performance in a three dimensional pipeline. A plurality of view transformations associated with an image may be received. The vertex data associated with the image may be received. Operation data may be determined by performing the view transformations on the compiled vertex data. A plurality of display lists may be determined through a single run of a vertex pipeline. A display list may be based on the operation data. Other embodiments are described and claimed.

26 Claims, 8 Drawing Sheets

TECHNIQUES FOR ENHANCING MULTIPLE VIEW PERFORMANCE IN A THREE DIMENSIONAL PIPELINE

BACKGROUND

Three dimensional technology plays a crucial role in the graphics development domain. Three dimensional technology is implemented in mobile devices such as smart phones, tablets and netbooks. The performance and power consumption of the three dimensional technology on the mobile devices is typically correlated to the user's visual experience and influences a product's competitive advantage.

Currently, each time an image is rendered from a different angle or view, information is sent over a three dimensional pipeline to the mobile device. Some of the information sent during each view is repetitive. For example, each time information is sent over the three dimensional pipeline, the same components are initialized and the same vertex data is sent. Reinitializing the components and resending the data negatively affects performance and power consumption. It is with respect to these and other considerations that the present improvements have been needed.

DETAILED DESCRIPTION

Various embodiments are directed to techniques for enhancing multiple view performance in a three dimensional pipeline. In an embodiment, a plurality of view transformations associated with an image may be received. Vertex data for the image may be received. The vertex data may be compiled. Operation data may be determined by performing the view transformations on the compiled vertex data. A plurality of display lists may be determined through a single run of a vertex pipeline. A display list may be based on the operation data.

In an embodiment, three dimensional images or objects may be rotated in a series of scenes. Different scenes may have a three dimensional image rotated with a different angle or view transformation. However, some data, such as vertex data, is the same in each view transformation. As a result, refining components within the three dimensional pipeline to generate multiple display lists with a plurality of view transformations with a single run through the vertex pipeline may enhance performance and save computing power. As a result, the embodiments can improve affordability, scalability, modularity, extendibility, or interoperability for an operator, device or network.

In particular, rendering rotating and multiple views of the three dimensional images for subsequent scenes in a single run of the vertex pipeline benefits three dimensional graphics performance. By generating multiple display lists in one vertex pipeline for rotating three dimensional graphics, duplicative efforts within the vertex pipeline may be unnecessary. Using the processes described below, the three dimensional pipeline does not have to initiate hardware states, load vertex data and allocate input and output spaces each time the same image is viewed at a different angle. In an embodiment, the number of redundant jobs for rendering multiple views of the three dimensional images between scenes may be reduced. In an embodiment, as a result of rendering multiple view transformations of the three dimensional image, duplicated direct memory access transfers may be eliminated as the vertex data is only loaded a single time from the application to the hardware device memory. The one time load of the vertex data may benefit three dimensional graphic performance and reduce computing effort. The benefit may be increased when a three dimensional image is complex and has a large number of vertexes. In an embodiment, by rendering multiple views of the three dimensional image in a single run of the vertex pipeline, the effort to initialize the vertex pipeline multiple times for the same vertex data may be eliminated. In an embodiment, by rendering multiple views of the three dimensional image in a single vertex pipeline, overall computing effort may be saved by reusing some common internal results on the computations for the multiple view transformations.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
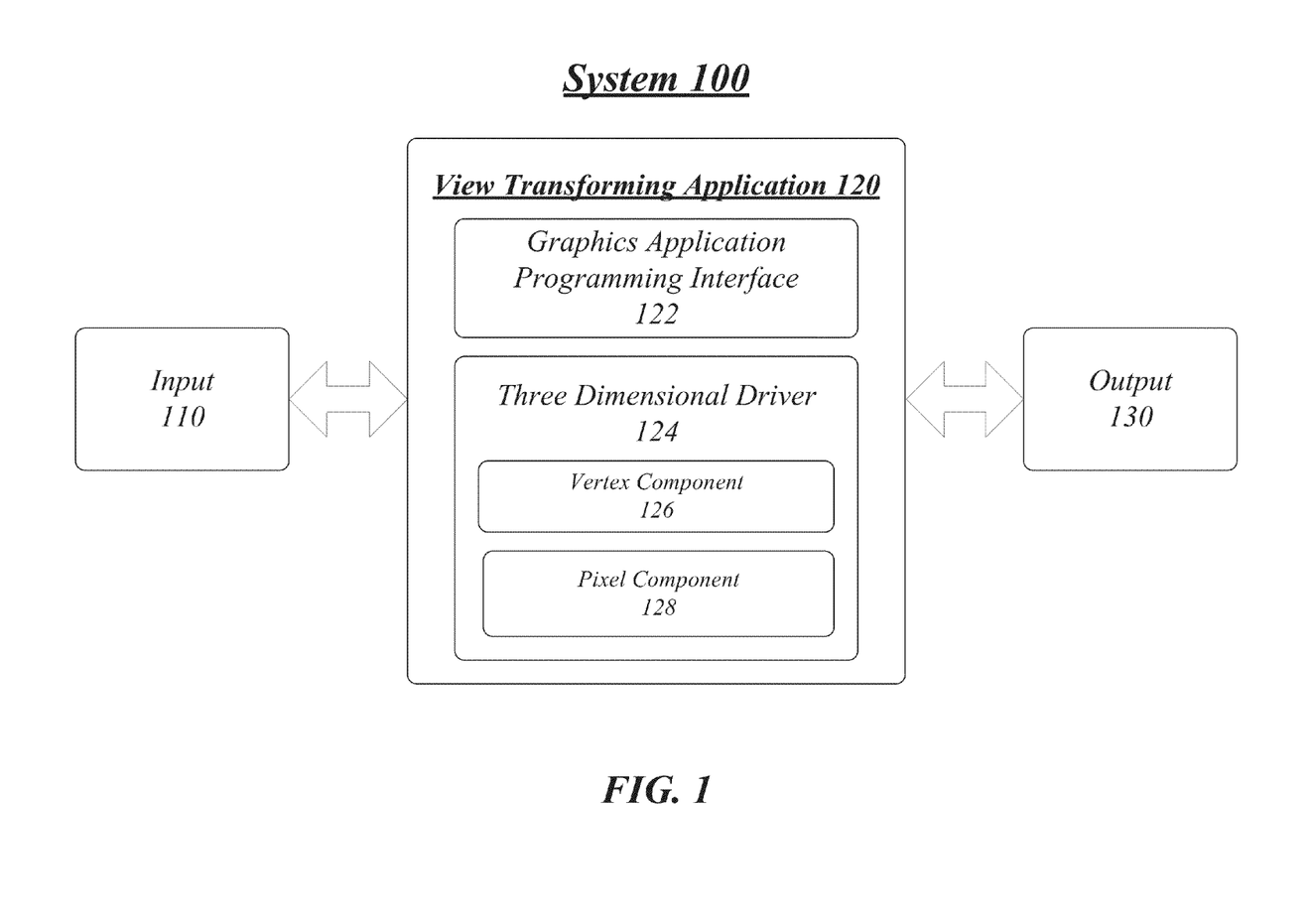
FIG. 1 illustrates an embodiment of a system for enhancing multiple view performance in a three dimensional pipeline.

FIG. 1 illustrates a block diagram for a system 100 for enhancing multiple view performance in a three dimensional pipeline. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

In an embodiment, the input 110 may include data such as, but not limited to, vertex data. The system 100 may comprise a view transforming operation 120. In an embodiment, the view transforming operation 120 may occur within a graphics processing unit. The view transforming operation 120 may include a graphics application programming interface 122 and a three dimensional driver 124.

In an embodiment, a graphics application programming interface 122 may receive information from a user and send the information to the three dimensional driver 124. In an embodiment, a graphics application programming interface 122 may receive a plurality of view transformations to render an image over a plurality of scenes. In an embodiment, display lists may be determined for the view transformations. In an embodiment, the graphics application programming interface 122 may receive an interval period between presenting sequential display lists. The graphics application programming interface 122 may send the number of view transformations and the interval period to the three dimensional driver 124.

The three dimensional driver 124 may include a vertex component 126 and a pixel component 128. The vertex component 126 may receive, compile and process vertex data. Operation data may be determined by performing view transformations on the compiled vertex data. A plurality of display lists may be determined through a single run of the vertex pipeline. The pixel component 128 may use the operation data from the vertex component 126 to render a display list to be presented.

In an embodiment, a three dimensional driver 124 may include a vertex component 126. The vertex component 126 may receive a plurality of view transformations associated with an image. The vertex component 125 may receive vertex data for the image. The vertex component 126 may take the vertex data compiled from the three dimensional driver 124 and perform view transformations on the compiled vertex data to determine operation data. The compiled vertex data may be vertex shader information or program code. The vertex component 126 may determine a plurality of display lists. In an embodiment, a display list may be based on operation data.

In an embodiment, the vertex component 126 may include a memory controller component and a shader processor component. The memory controller component may allocate multiple output spaces within a shader processor component. In an embodiment, the vertex data may be compiled by the three dimensional driver so that it is recognized by the shader processor component. The shader processor component may use the compiled vertex data to perform transformation and lighting. The shader processor component may generate the operation data and place the operation data into previously allocated output spaces.

In an embodiment, the memory controller component may allocate multiple input spaces within a tiling processor component. The tiling processor component may be included within the vertex component 126. The tiling processor component may receive the operation data from the shader processor component and clip and tile the operation data. The tiling processor component may output the clipped and tiled data into a plurality of display lists.

In an embodiment, the pixel component 128 may render an image based on a view. As the transforming application includes the vertex component performing multiple view transforms within a single vertex pipeline, multiple views of each image may be listed on multiple display lists. In an embodiment, a different view may be stored in a different display list. The display lists may be stored in one or more output buffers. The pixel component may render each display list sequentially according to an interval period received from the application programming interface.

In an embodiment, the output 130 may include a three dimensional image. In an embodiment, the output may include various views of a three dimensional image with the view corresponding to the display list.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
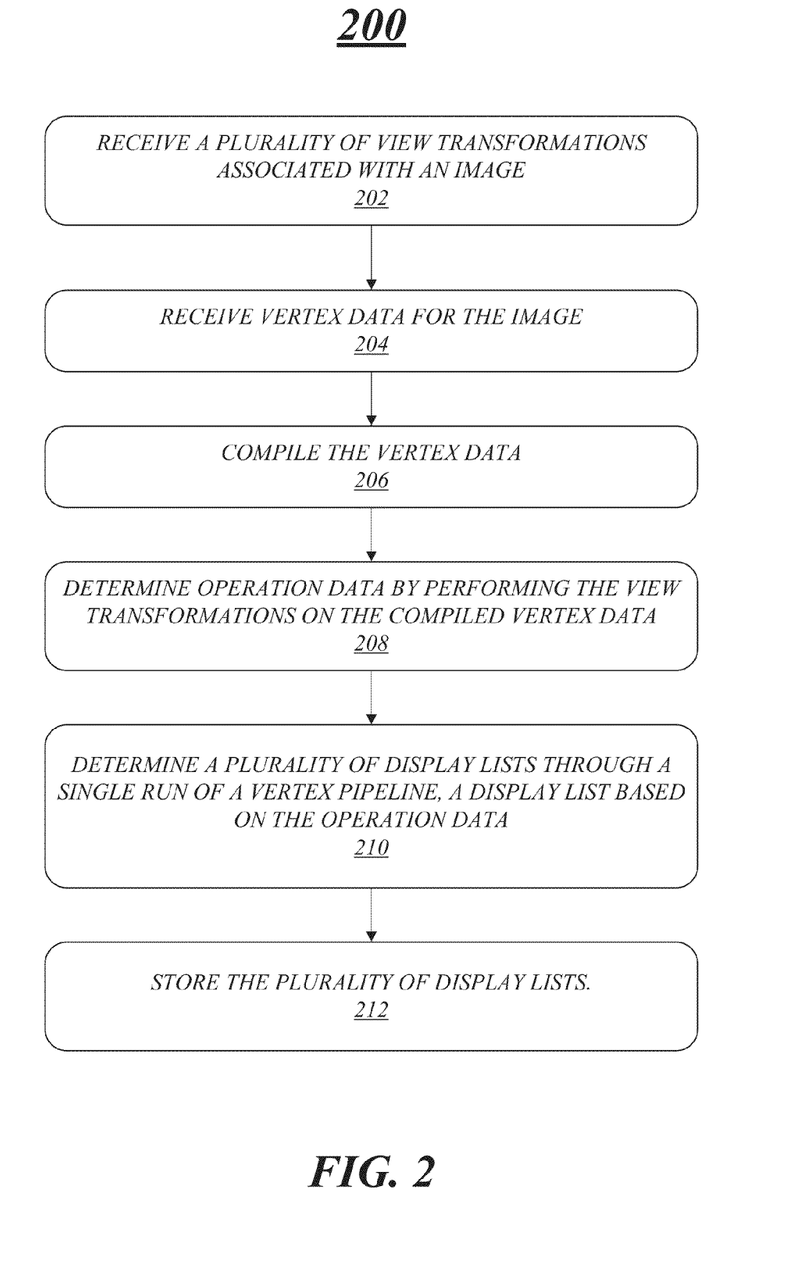
FIG. 2 illustrates an embodiment of a logic flow for the system of FIG. 1.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may receive a plurality of view transformations associated with an image at block 202. For example, an image may be viewed at different angles in sequential three dimensional scenes. An image may be rendered in a variety of angles or views. A three dimensional image may often be rendered in a plurality of view transformations to depict the image as rotating. Instead of using the image pipeline separately for each view transformation of the image, a plurality of view transformations may be received at a single time. The view transformation data may be depicted as models and/or view transform matrices. In an embodiment, view transformations may include views of an image with different scaling, rotation and/or translation.

The logic flow 200 may receive vertex data for the image at block 204. In an embodiment, vertex data may include information about the object or image. In an embodiment, vertex data may be used to describe the image in a modeling system. For example, vertex data may include the color, position, lighting, etc for an image. For example, an image may be a table and the table may include four vertex data. Each vertex data may include information about a part of the image including, but not limited to, a particular position and/or color associated with a particular angle or view transformation. The embodiments are not limited to this example.

The logic flow may compile the vertex data at block 206. In an embodiment, the vertex data may be compiled by the three dimensional driver. The vertex component may include a shader processor component. In an embodiment, compiled vertex data may be used by the shader processor as program code.

The logic flow 200 may determine operation data by performing the view transformations on the compiled vertex data at block 208. Information associated with a view of an image may be different for different view transformations. However, the vertex data may remain the same for the different view transformations. By having multiple views in the three dimensional pipeline at a single time, the vertex data only needs to be received and compiled a single time. For example, the shader processor component may determine multiple views using the view transformations which may include matrices and/or models of various views. The shader processor component may process the compiled vertex data in order to transform the vertex data into the different views.

The compiled vertex data may be vertex shader information or program code for the shader processor component. In an embodiment, program code may enable the shader processor component to run and process the plurality of views. The compiled vertex data may be received a single time and can be used as program code to process the different view transformations. The shader processor component may receive multiple views at once and process the plurality of views on the compiled vertex data through a single run of the vertex pipeline. In an embodiment, multiple view transformations may be handled one by one by a graphical processing unit within a single vertex phase. In an embodiment, multiple views may be processed simultaneously.

Once the shader processor component receives a program that includes matrices and/or models of various views, the shader processor component may simultaneously perform multiple view transformations for each vertex and generate operation data. In an embodiment, the operation data may be stored into previous allocated memory. In an embodiment, the operation data corresponding to each vertex may be stored individually into previously allocated memory. The embodiments are not limited to this example.

The logic flow 200 may determine a plurality of display lists through a single run of a vertex pipeline at block 210. In an embodiment, the vertex component may generate multiple display lists through a single run of the vertex pipeline in order to render sequential three dimensional scenes. In an embodiment, a display list may be based on the operation data. For example, if there were eight vertex data for an image and there were three angles or view transformations in which the image may be rendered, there would be twenty four (or eight times three) pieces of operation data. The embodiments are not limited to this example.

In an embodiment, the logic flow 200 may store the plurality of display lists at block 212. In an embodiment, the plurality of display lists may be stored in one or more output buffers.

Figure 3:
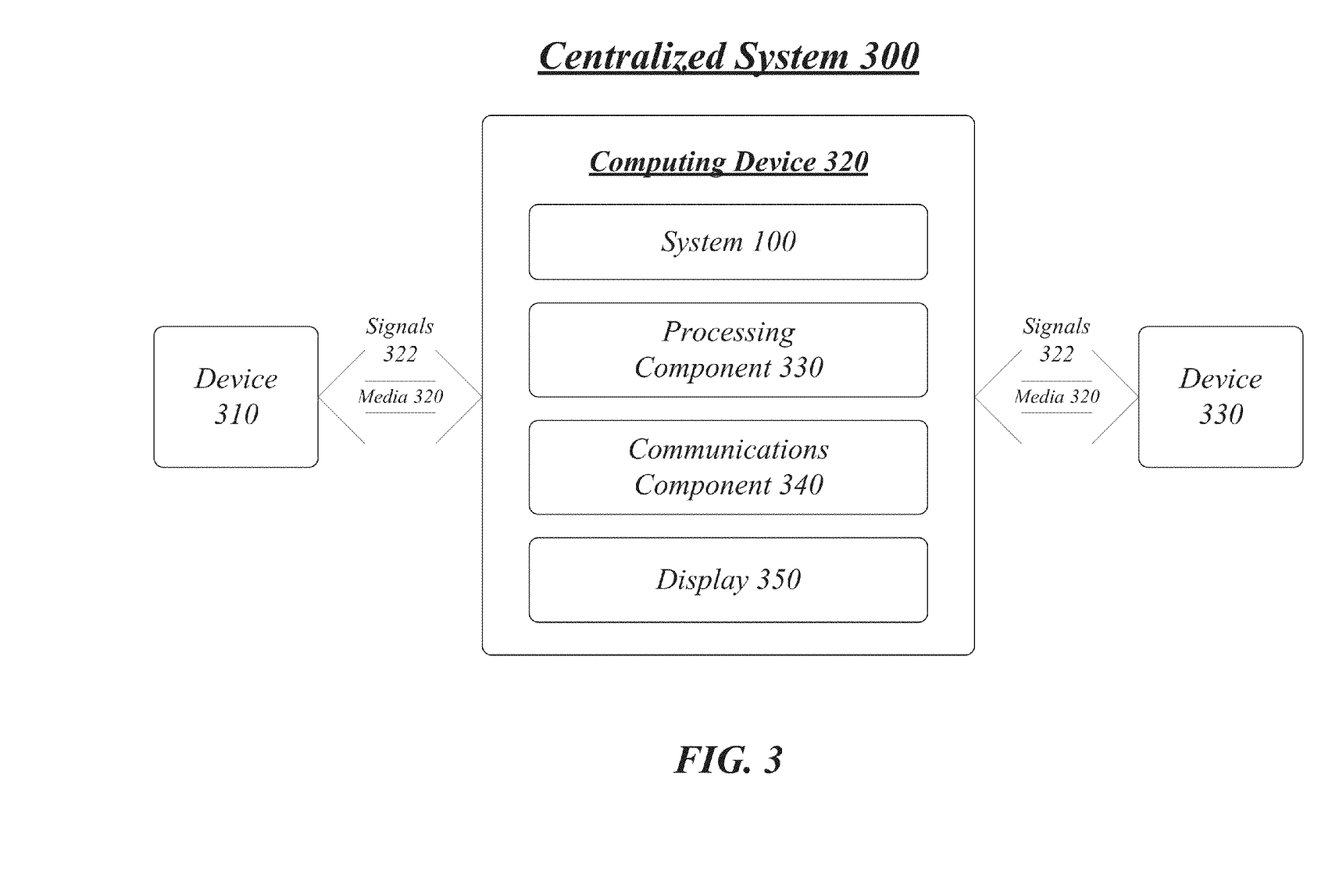
FIG. 3 illustrates an embodiment of a centralized system for the system of FIG. 1.

FIG. 3 illustrates a block diagram of a centralized system 300. The centralized system 300 may implement some or all of the structure and/or operations for the system 100 in a single computing entity, such as entirely within a single computing device 320.

The computing device 320 may execute processing operations or logic for the system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the system 100 using a communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 320 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 320.

The computing device 320 may communicate with other devices 310, 330 over a communications media 320 using communications signals 322 via the communications component 340.

In an embodiment, a computing device 320 may comprise a display 350. In one embodiment, the display 350 may comprise a liquid crystal display (LCD). In one embodiment, the display 350 may comprise an organic light emitting diode (OLED) display. In one embodiment, an OLED display may be used as it provides better color saturation and viewing angles then a liquid crystal display (LCD). In one embodiment, the display 350 may comprise one or more OLED display screens.

Figure 4:
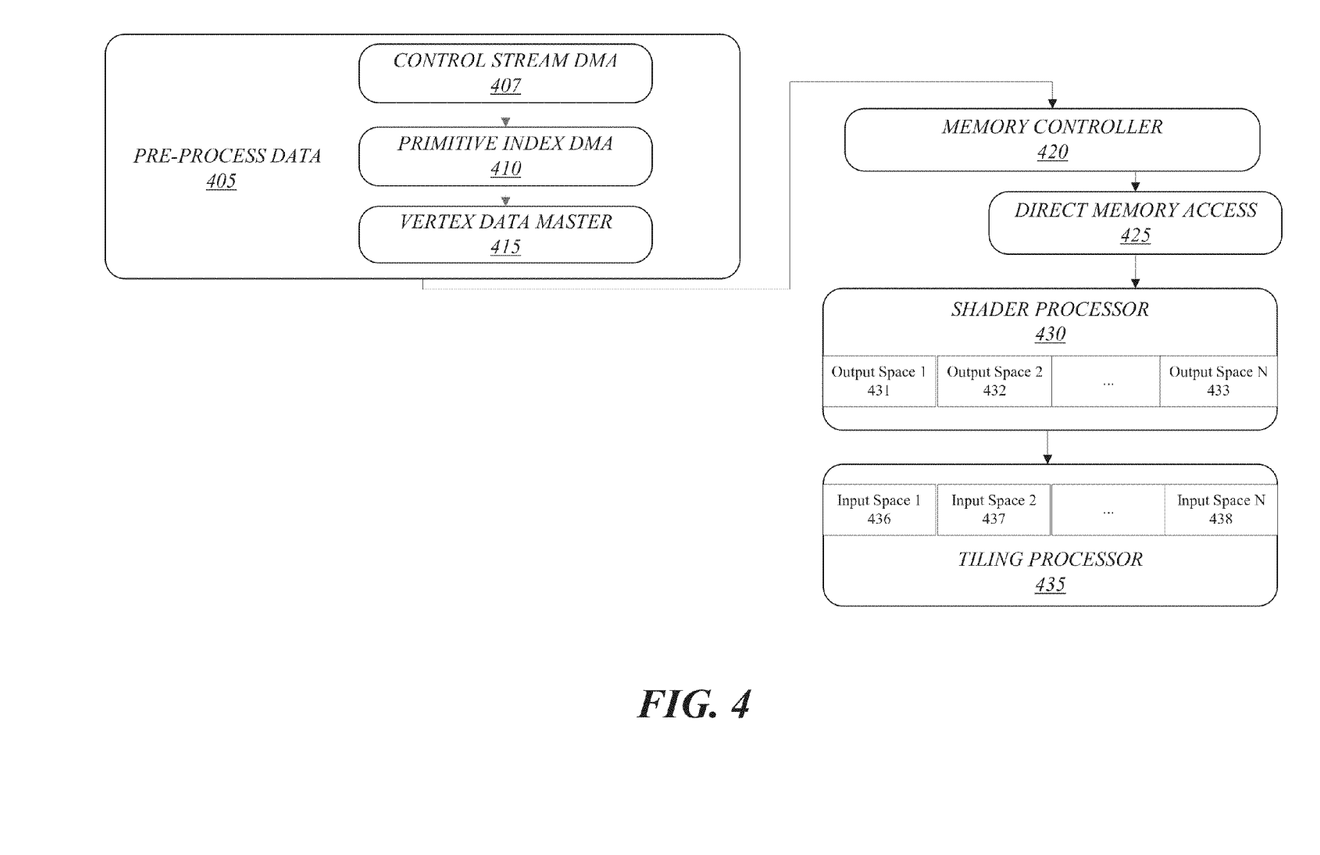
FIG. 4 illustrates an embodiment of a distributed system for the system of FIG. 1.

FIG. 4 illustrates an embodiment of a logic flow within a vertex component of the three dimensional pipeline. As shown in FIG. 4, the three dimensional pipeline does not have to initiate hardware states, load vertex data and allocate input and output spaces each time the same image is viewed at a different angle. The processes shown in FIG. 4 reduce the number of redundant jobs for rendering multiple views of the three dimensional images between scenes and benefit three dimensional graphics performance.

In an embodiment, by creating display lists with multiple view transformations, duplicated direct memory access transfers may be eliminated as the vertex data is only loaded a single time to the hardware device memory. The one time load of the vertex data may benefit three dimensional graphic performance and reduce the computing effort.

In an embodiment, the data may be pre-processed 405. In an embodiment, a control stream direct memory access 407 may receive an input stream. In an embodiment, the control stream direct memory access 407 may send a command to the graphical processing unit to fetch a control stream. After the control stream is received, the primitive index direct memory access 410 may receive a vertex index list. In an embodiment, the vertex index list may be address information for the vertex data which may be received by the shader processor component 430. The vertex data master 415 may prepare the vertex index list from the programmable sequencer. In an embodiment, the vertex data master 415 may include a hardware component that helps to fetch vertex index lists from external memory. In an embodiment, the vertex data master 415 may help to configure the memory controller 420.

In an embodiment, the memory controller 420 may have the one or more direct memory accesses 425 load vertex data according to the configuration and the index list. The memory controller component 420 may receive vertex data from direct memory access 425. In an embodiment, the vertex data may be information about an image. In an embodiment, the vertex data may include modeling data. In an embodiment, vertex data may include data describing an image in a modeling system. In an embodiment, vertex data may include, but is not limited to, position and/or color information about a particular vertex of an object or image. For example, the vertex data may include position information about the edge of an image.

In an embodiment, the memory controller 420 may create a series of direct memory accesses 425 to load compiled vertex data into the shader processor component. The vertex data may be compiled by the three dimensional driver. The shader processor component 430 may receive the compiled vertex data as program code and process each vertex of an image using the view transformations.

In an embodiment, the memory controller component 420 may allocate output spaces within a shader processor component 430. In an embodiment, the memory controller component 420 may allocate output spaces within the shader processor component 430 for vertex primary attribute data and vertex secondary attribute data. In an embodiment, vertex primary attribute data may refer to values which are unique to a vertex. For example, a position value may be vertex primary attribute data as each vertex may have a specific position. For example, a color value may be vertex primary attribute data as each vertex may have a different color. In an embodiment, vertex secondary attribute data may refer to values which are common among one or more of the vertices within a three dimensional scene. For example, a view transform matrix may be vertex secondary attribute data as the vertices in a scene may be observed from the same angle.

The shader processor component 430 may receive the compiled vertex data as program code or vertex shader information. In an embodiment, a matrix from the compiled vertex data may be loaded into the secondary attribute space of the vertex data. In an embodiment, the shader processor component 430 may combine vertex shader and pixel shader graphic, video and image processing features and capabilities into a single scalable processing unit.

In an embodiment, the memory controller component 420 may allocate multiple output spaces within the shader processor component 430 in order to handle multiple view transformations within a single run of the vertex pipeline. In an embodiment, the memory controller component 420 may allocate N output spaces for the shader processor component 430 to include the calculated results for N different view transform matrices or models. In an embodiment, the view transformations may be processed using view transform matrices.

For example, in FIG. 4, the shader processor component 430 may include multiple output spaces 431, 432, 433 instead of a single output space. The output data may include operation data. The first output space 431 may be the operation data for the first view transformation or first angle. The second output space 432 may be operation data for the second view transformation or second angle. The Nth output space 433 may be operation data for the Nth view transformation or Nth angle.

After the multiple views are processed and placed in multiple output spaces within the shader processor component 430, the memory controller component 420 may allocate multiple input spaces within the tiling processor component 435. In an embodiment, signals may be received from the shader processor component 430 that the operation data is available. The tiling processor may read the operation data from the shader processor component 430 to its corresponding input spaces in the tiling processor component 435. In an embodiment, the memory controller component 120 may send the operation data to the tiling processor component 435 to perform clipping and tiling.

In an embodiment the tiling processor component 145 may perform a series of operations such as primitive construction and/or view clipping on the operation data. In an embodiment, each operation may be applied to each output of the shader processor component 130 and a display list output 140 may be generated for later pixel processing in the pixel pipeline. In an embodiment, the tiling processor component 435 may clip and tile the operation data.

In FIG. 4, the tiling processor component 435 may include multiple input spaces 436, 437, 438 instead of a single input space. The first input space 436 may be the operation data for the first view transformation or first angle. The second input space 437 may be the operation data for the second view transformation or second angle. The Nth input space 438 may be the operation data for the Nth view transformation or Nth angle.

In an embodiment, the tiling processor component 435 may be optional. For some graphical processing units that do not perform tiling and/or clipping, the operation data from the shader processor component may be stored in individual output spaces. Each output space in the shader processor may correspond to a different view transform matrix and may be moved into a system buffer waiting for rendering in the pixel phase. At the end of the vertex pipeline, there may be N display lists generated and stored into N system buffers waiting for pixel rendering. In an embodiment, the three dimensional driver may ensure that each display list may be successfully located for the pixel pipeline.

Figure 5:
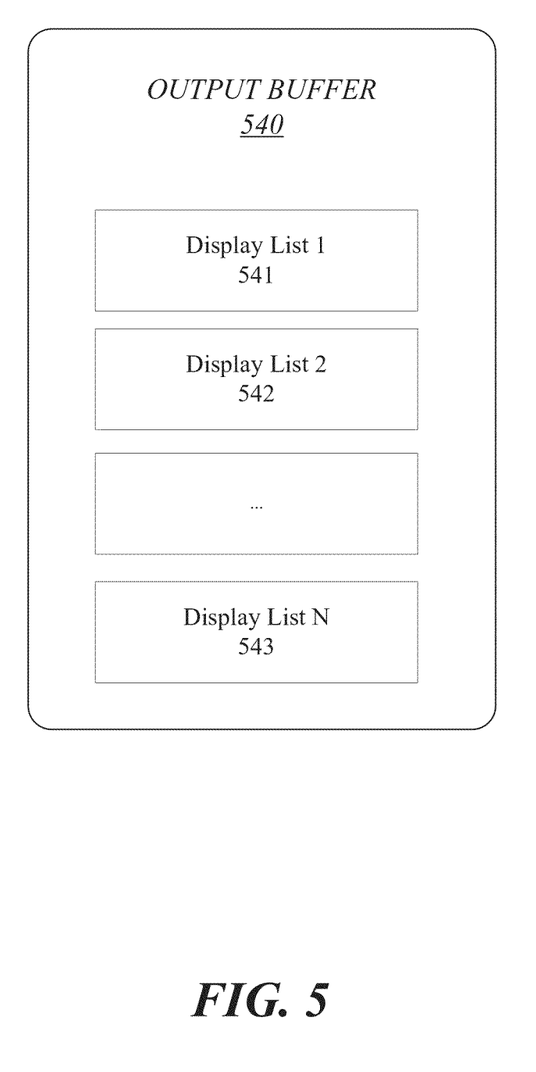
FIG. 5 illustrates an embodiment of an output buffer.

FIG. 5 illustrates an embodiment of an output buffer. In an embodiment, the output buffer 540 may include multiple display lists 541, 542, 543. The operation data may output the plurality of display lists 541, 542, 543 to be saved in the buffer 540. Instead of a single display list determined each time the vertex phase is run, multiple display lists may be determined through a single run of the vertex phase. In an embodiment, the vertex phase may be run with vertex data and multiple view transformations and the output buffer 540 may store multiple display lists 541, 542, 543. In an embodiment, each display list may include a specified image rotating angle or view transformation. In an embodiment, a first display list 541 may be the final operation data for a first angle or first view transformation. In an embodiment, a second display list 542 may be the final operation data for a second angle or second view transformation. In an embodiment, a Nth display list 542 may be the final operation data for a Nth angle or Nth view transformation.

Figure 6:
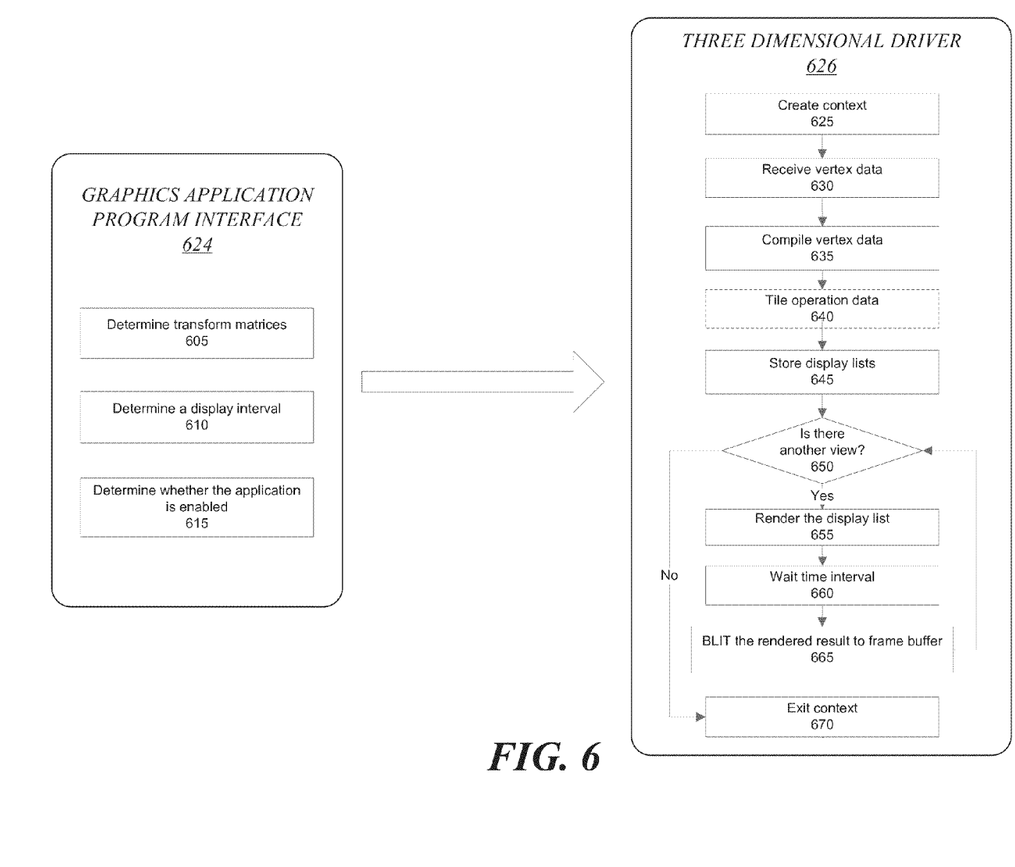
FIG. 6 illustrates an embodiment of the communication between the graphics application programming interface and the three dimensional driver.

FIG. 6 illustrates an embodiment of the communication between the graphics application programming interface and the three dimensional driver. In an embodiment, the graphics application programming interface 624 may communicate user preferences with the three dimensional driver 626.

In an embodiment, the graphics application programming interface 624 may perform one or more functions. The graphics application programming interface 624 may assign multiple view transform matrices. Multiple transform matrices may be assigned in order to render rotating three dimensional scenes. A view transform matrix may relate to an image rotating angle. Multiple view transform matrices may enable the image to appear to rotate as the image may be rendered from multiple angles. The graphics application programming interface 624 may be able to specify a time delay between two sequential scenes. The graphics application programming interface 624 may enable or disable the function of rendering multiple sequential views.

The three dimensional driver 636 may be enhanced in one or more aspects. In an embodiment, the three dimensional driver 636 may determine operation data by performing view transformations on compiled vertex data. In an embodiment, the view transformation matrices may be supplied by the graphics application programming interface 624. In an embodiment, the three dimensional driver 626 may allocate one or more system buffers to include display lists which are generated by the vertex pipeline. In an embodiment, each buffer address may be embedded into the memory controller component to ensure that the hardware component within the vertex pipeline and the first hardware component in the pixel pipeline can locate the display lists in the one or more output buffers.

In an embodiment, the three dimensional driver 626 may begin pixel rendering by reading the display list to the pixel pipeline. The three dimensional driver 626 may render a display list based on a view transformation. In an embodiment, the pixel pipeline in the three dimensional driver 626 may render the plurality of display lists sequentially according to an interval period.

In an embodiment, the graphics application programming interface 624 may determine and assign multiple view transform matrices in order to render rotating three dimensional scenes 605. The graphics application programming interface 624 may receive input as to the time interval between rendering sequential scenes. In an embodiment, the time interval 610 received by the graphics application programming interface 624 may be used by the three dimensional driver 626. An image may be presented in a view transformation for the length of the time interval before the render result may be BLIT to the frame buffer to present another angle of the image. In an embodiment, the graphics application programming interface 624 may be enabled 615 to process multiple angles during a single run through the vertex pipeline.

The three dimensional driver 626 may create a context 625. In an embodiment the three dimensional driver 626 may receive vertex data 630. In an embodiment, the three dimensional driver 626 may obtain the view transform matrices. In an embodiment, the three dimensional driver 626 may compile the vertex data 635. In an embodiment, the three dimensional driver 626 may determine operation data by performing the view transform matrices on the compiled vertex data in the shader processor component.

The three dimensional driver 626 may allocate system memory for the plurality of display lists to be generated at the end of the vertex pipeline using the operation data. The shader processor component may perform transformations and/or lighting on each vertex of the image or object. The shader processor component may generate operation data according to the view transform matrices.

In an embodiment, the operation data may be tiled 640. In an embodiment, the operation data may be read to individual spaces within the tiling processor component for clipping and tiling.

At the end of the vertex pipeline, multiple display lists 645 may be generated and stored in system memory and/or one or more buffers. In an embodiment, a display list may be stored in a system buffer. Once the display list has been generated, the vertex pipeline has been completed. The time interval for displaying the rendered images specified by the graphics application programming interface 624 may be communicated to the three dimensional pipeline.

In an embodiment, when the three dimensional vertex phase has multiple view transformations to perform, the vertex phase may generate individual display lists. The pixel phase 650 may render each display list in the pixel pipeline.

In an embodiment, the three dimensional driver may render each display list 655 sequentially according to the time interval 660 set by a user in the graphics application programming interface 624. In an embodiment, the three dimensional driver 626 may wait the time interval 660. After the time interval, the rendered result may be BLIT to the frame buffer to be presented 665.

In an embodiment, the three dimensional driver 626 may determine whether there is another display list waiting for rendering in the pixel phase 650. If there is another display list, the display list may be rendered in the pixel phase 650. The three dimensional driver 626 may wait the time interval 660 and then BLIT the rendered result to the frame buffer for display 665. When the last display list has been BLIT and presented and there are no more views 650, the context may end 670.

Figure 7:
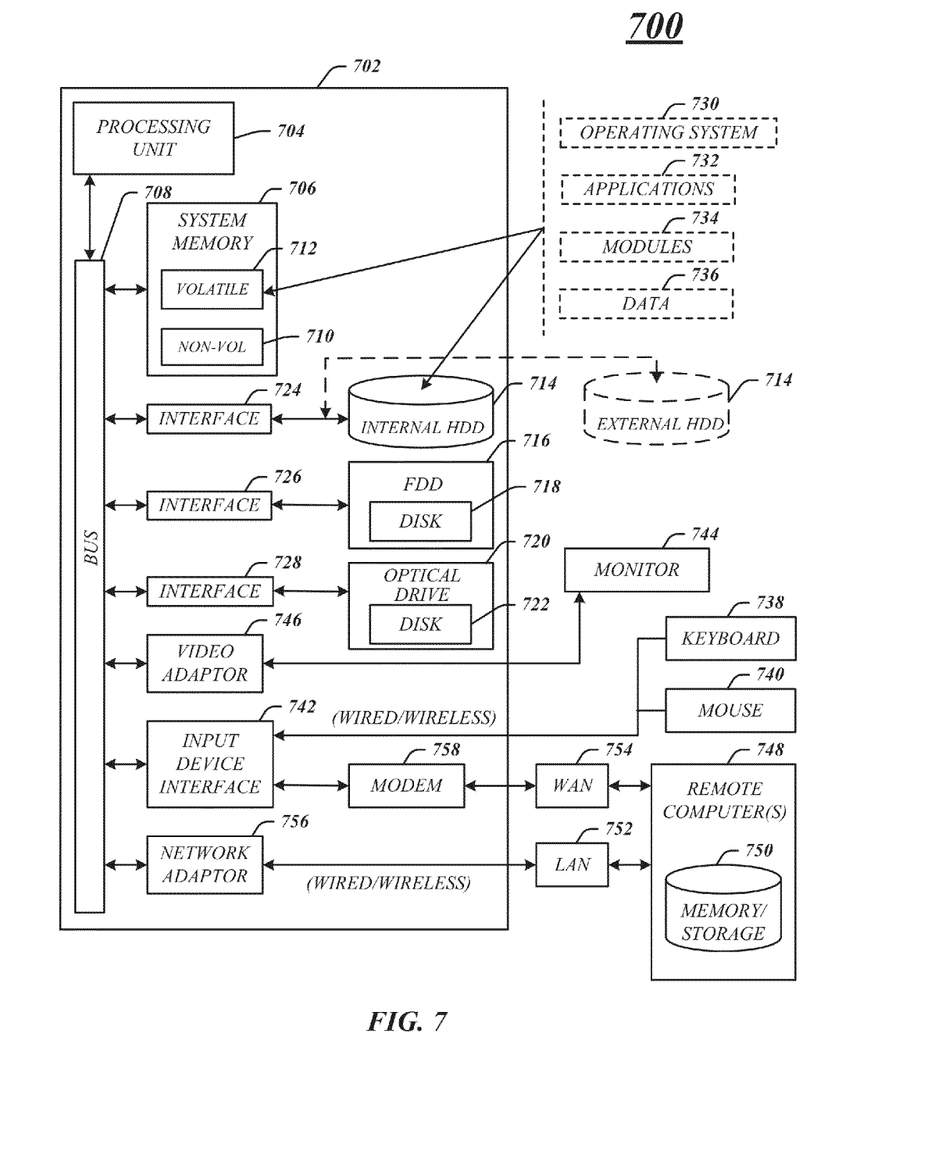
FIG. 7 illustrates an embodiment of a computing architecture.

FIG. 7 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

The one or more application programs 732, other program modules 734, and program data 736 can include, for example, the graphics application interface 122 and the three dimensional driver 124 with the vertex component 126 and the pixel component 128.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
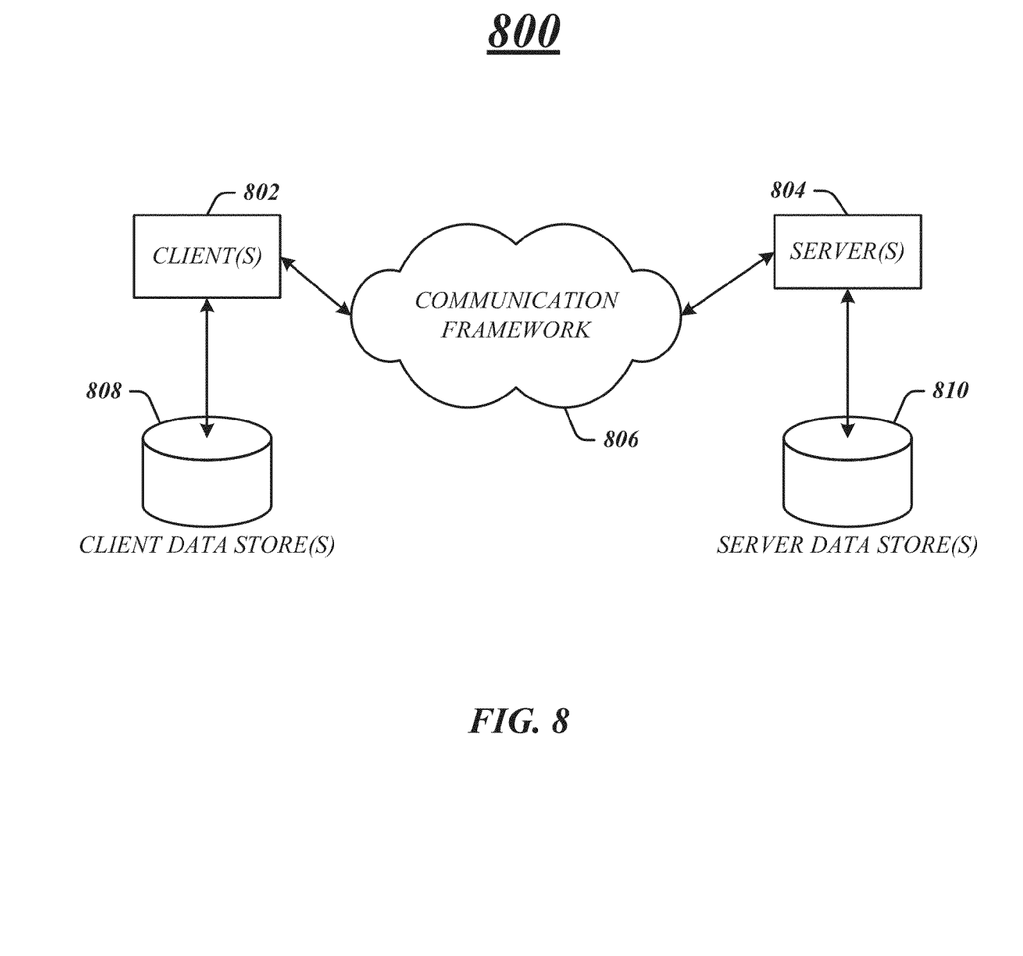
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client system 320. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 300 and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An article of manufacture comprising a non-transitory storage medium containing instructions that when executed cause a system to:
   receive a plurality of view transformations, each view transformation of the plurality of view transformations to be associated with a respective view among a plurality of views of a three dimensional image;
   compile vertex data associated with the image;
   determine operation data by performing the plurality of view transformations on the compiled vertex data; and
   determine a plurality of display lists from the operation data through a single run of a vertex pipeline, each display list of the plurality of display lists to be associated with a respective view of the plurality of views.

2. The article of manufacture of claim 1, the non-transitory storage medium containing instructions that when executed cause the system to receive the vertex data associated with the image.

3. The article of manufacture of claim 1, the non-transitory storage medium containing instructions that when executed cause the system to render the plurality of display lists sequentially according to an interval period.

4. The article of manufacture of claim 1, the non-transitory storage medium containing instructions that when executed cause the system to store the plurality of display lists in one or more buffers.

5. The article of manufacture of claim 1, the non-transitory storage medium containing instructions that when executed cause the system to:
   clip the operation data; and
   tile the clipped operation data.

6. The article of manufacture of claim 1, the non-transitory storage medium containing instructions that when executed cause the system to cause the system to allocate multiple input spaces within a tiling processor, each input space of the multiple input spaces to store a respective portion of the operation data, and each stored portion to be associated with a respective view transformation of the plurality of view transformations.

7. The article of manufacture of claim 1, the non-transitory storage medium containing instructions that when executed cause the system to allocate multiple output spaces within a shader processor, each output space of the multiple output spaces to store a respective portion of the operation data, and each stored portion to be associated with a respective view transformation of the plurality of view transformations.

8. A method, comprising:
   receiving at a graphics processing unit a plurality of view transformations, each view transformation of the plurality of view transformations to be associated with a respective view among a plurality of views of a three dimensional image;

compiling vertex data associated with the image;

determining operation data by performing the plurality of view transformations on the compiled vertex data;

determining a plurality of display lists from the operation data through a single run of a vertex pipeline of the graphics processing unit, each display list of the plurality of display lists to be associated with a respective view of the plurality of views; and storing the plurality of display lists within memory coupled to the graphics processing unit.

9. The method of claim 8, comprising:
receiving at the graphics processing unit the vertex data associated with the image.

10. The method of claim 8, comprising:
rendering the plurality of display lists sequentially according to an interval period.

11. The method of claim 8, comprising:
storing within the memory the plurality of display lists in one or more buffers.

12. The method of claim 8, comprising:
clipping the operation data; and
tiling the clipped operation data.

13. The method of claim 8, comprising:
allocating multiple input spaces within a tiling processor of the graphics processing unit, each input space of the multiple input spaces to store a respective portion of the operation data, and each stored portion to be associated with a respective view transformation of the plurality of view transformations.

14. The method of claim 8, comprising:
allocating multiple output spaces within a shader processor of the graphics processing unit, each output space of the multiple output spaces to store a respective portion of the operation data, and each stored portion to be associated with a respective view transformation of the plurality of view transformations.

15. An apparatus comprising:
a graphics processing unit comprising:
a three dimensional driver with a vertex component operative to:
receive a plurality of view transformations, each view transformation of the plurality of view transformations to be associated with a respective view among a plurality of views of a three dimensional image;
compile vertex data for the image;
determine operation data by performing the plurality of view transformations on the compiled vertex data; and
determine a plurality of display lists from the operation data through a single run of a vertex pipeline, each display list of the plurality of display lists to be associated with a respective view of the plurality of views.

16. The apparatus of claim 15, the vertex component comprising:
a memory controller component operative to:
allocate multiple output spaces within a shader processor; and the shader processor to:
receive the compiled vertex data, and
place the operation data in the multiple output spaces, each output space of the multiple output spaces to store a respective portion of the operation data, and each stored portion to be associated with a respective view transformation of the plurality of view transformations.

17. The apparatus of claim 13, the graphics processing unit comprising:
an application program interface operative to receive the plurality of view transformations to render an image.

18. The apparatus of claim 15, the graphics processing unit comprising:
an application program interface operative to receive an interval period between rendering sequential display lists.

19. The apparatus of claim 15, the graphics processing unit comprising:
an application program interface operative to determine whether a view transforming application is enabled.

20. The apparatus of claim 15, the vertex component comprising:
a memory controller operative to allocate multiple input spaces within a tiling processor; and
the tiling processor to:
receive the operation data, and
clip and tile the operation data.

21. The apparatus of claim 15, the three dimensional driver comprising:
a pixel component operative to render the plurality of display lists sequentially according to an interval period.

22. The apparatus of claim 15, the three dimensional driver comprising:
one or more buffers to store the plurality of display lists.

23. The apparatus of claim 15, comprising:
a digital display communicatively coupled to the graphics processing unit, the digital display operative to present the plurality of views transformations of the image.

24. A system, comprising:
a processing unit to execute a three dimensional driver;
a display accessible to the processing unit;
a memory unit coupled to the processing unit to store the three dimensional driver, the three dimensional driver to cause the processing unit to:
receive at the processing unit a plurality of view transformations, each view transformation of the plurality of view transformations to be associated with a respective view among a plurality of views of a three dimensional image;
receive at the processing unit vertex data for the image;
compile the vertex data;
determine operation data by performing the plurality of view transformations on the compiled vertex data;
determine a plurality of display lists from the operation data through a single run of a vertex pipeline of the processing unit, each display list of the plurality of display lists to be associated with a respective view of the plurality of views; and
render the plurality of views on the display.

25. The system of claim 24, the three dimensional driver to cause the processing unit to render the plurality of display lists sequentially according to an interval period.

26. The system of claim 24, the three dimensional driver to cause the processing unit to:
clip the operation data; and
tile the clipped operation data.

* * * * *